(12) United States Patent
Cao et al.

(10) Patent No.: US 11,442,174 B2
(45) Date of Patent: Sep. 13, 2022

(54) SYSTEMS AND METHODS FOR INERTIAL MEASUREMENT UNIT AIDED DETECTION AND EXCLUSION AGAINST SPOOFING ATTACKS

(71) Applicant: Honeywell International Inc., Morris Plains, NJ (US)

(72) Inventors: Xiao Cao, Shanghai (CN); Ping Ye, Shang Hai (CN); Brian Schipper, Maple Grove, MN (US)

(73) Assignee: Honeywell International Inc., Charlotte, NC (US)

( * ) Notice: Subject to any disclaimer, the term of this patent is extended or adjusted under 35 U.S.C. 154(b) by 318 days.

(21) Appl. No.: 16/858,250

(22) Filed: Apr. 24, 2020

(65) Prior Publication Data

US 2021/0333409 A1  Oct. 28, 2021

(51) Int. Cl.
*G01S 19/21* (2010.01)
*G01S 19/40* (2010.01)
(Continued)

(52) U.S. Cl.
CPC .......... *G01S 19/215* (2013.01); *G01S 19/20* (2013.01); *G01S 19/393* (2019.08); *G01S 19/40* (2013.01); *G01S 19/49* (2013.01)

(58) Field of Classification Search
CPC .................................................. G01S 19/215
See application file for complete search history.

(56) References Cited

U.S. PATENT DOCUMENTS 8,922,427 B2    12/2014 Dehnie et al.
9,341,718 B2 *   5/2016 Vanderwerf ............ G01S 19/28
(Continued)

FOREIGN PATENT DOCUMENTS

CN        110715660 A       1/2020

OTHER PUBLICATIONS

Daneshmand et al., "Integration of GNSS and INS with a phased array antenna", Department of Geomatics Engineering, Nov. 4, 2017, pp. 1-14, PLAN Group Schulich School of Engineering, University of Calgary, Springer.
(Continued)

*Primary Examiner* — Cassi J Galt
(74) *Attorney, Agent, or Firm* — Fogg & Powers LLC (57) ABSTRACT

Techniques for detecting and excluding spoofed Global Navigation Satellite System (GNSS) signals are described. Using position data acquired from inertial sensors, a line of sight (LOS) estimation can be determined to various satellites. This data can be compared with range data provided by a GNSS receiver, for example, by subtracting the LOS estimations with corresponding GNSS ranges. The difference can then be compared to an appropriate threshold to determine whether GNSS spoofing is present. Additionally, the non-spoofed GNSS signals can be used to generate an updated position solution, which is verified by an integrity algorithm. If verified, the updated position solution can be used to calculate the position of the vehicle. However, if not verified, the disclosed techniques can adjust the thresholds used to determine GNSS spoofing and perform additional iterations of integrity monitoring to acquire a verified positioning solution.

20 Claims, 7 Drawing Sheets

(51) Int. Cl.
    *G01S 19/49*     (2010.01)
    *G01S 19/20*     (2010.01)
    *G01S 19/39*     (2010.01)

(56) References Cited

U.S. PATENT DOCUMENTS

| | | |
|---|---|---|
| 9,849,978 B1 | 12/2017 | Carmack et al. |
| 10,094,930 B2 | 10/2018 | Schipper et al. |
| 11,099,276 B2* | 8/2021 | Lentz .................... G01S 19/215 |
| 2009/0167597 A1 | 7/2009 | Strachan |
| 2016/0377726 A1 | 12/2016 | Schipper et al. |
| 2018/0088241 A1 | 3/2018 | Altrichter |
| 2020/0371246 A1* | 11/2020 | Marmet ................ G01S 5/0215 |

OTHER PUBLICATIONS

European Patent Office, "Extended European Search Report from EP Application No. 21167927.9", from Foreign Counterpart to U.S. Appl. No. 16/858,250, filed Sep. 23, 2021, pp. 1 through 10, Published: EP.

Han et al. "Antispoofing RAIM for Dual-Recursion Particle Filter of GNSS Calculation", IEEE Transactions on Aerospace and Electronic Systems, Apr. 2016, pp. 836 through 851, vol. 52, No. 2, IEEE.

\* cited by examiner

SYSTEMS AND METHODS FOR INERTIAL MEASUREMENT UNIT AIDED DETECTION AND EXCLUSION AGAINST SPOOFING ATTACKS

BACKGROUND

As Global Navigation Satellite Systems (hereinafter "GNSS") technology continues to ubiquitously impact the transportation market, one lingering problem in the reliance of GNSS technology has been the increased risk to integrity of these systems, e.g. integrity of signals acquired by receivers. While GNSS technology provides an accurate and responsive means of navigation assistance, it is susceptible to external interference, possibly by a malicious entity, that can deceive GNSS receivers to misguide trusting travelers. One example of such interference is known as GNSS "spoofing". GNSS spoofing occurs when GNSS signals are manipulated, either intentionally or otherwise, before they are received by a GNSS receiver.

Without means for detecting when received GNSS signals have been spoofed or otherwise interfered with, the receiver usually cannot determine whether the received signals are valid and trustworthy. For vehicles (such as aircraft, land-based vehicles, ships, submarines, or spacecraft) that rely extensively on GNSS technology for effective navigation, spoofing events can be extremely dangerous if spoofed GNSS signals remain undetected and relied upon. Possible adverse consequences of GNSS spoofing include threats to crew and passenger safety, for example, if the vehicle lacks the resources to maintain travel (e.g. flight) in reliance on a misdirected signal, or if the vehicle unknowingly approaches restricted locations, such as hostile airspace or waters. Even if a vehicle manages to identify GNSS spoofed signals, the vehicle should be equipped with alternative positioning systems so that voyage expectations are not compromised.

Therefore, there is a need in the art to identify potential GNSS spoofing attacks and exclude such attacks from adversely impacting a vehicle during travel.

SUMMARY

In one embodiment, a system is provided. The system comprises a processor and an inertial measurement unit (IMU) coupled to the processor, wherein the IMU is configured to acquire a series of dynamic measurements for a vehicle corresponding to a time period, and transmit the series of dynamic measurements to the processor. Furthermore, a Global Navigation Satellite System (GNSS) receiver is coupled to the processor, wherein the GNSS receiver is configured to receive GNSS data for the vehicle comprising satellite ephemeris data and range data corresponding to the time period and transmit the GNSS position data to the processor. A reference clock is also coupled to the GNSS receiver and the processor, wherein the reference clock is configured to synchronize the time period with a reference time period. The processor is configured to calculate navigation reckoning based on the series of dynamic measurements. The processor is further configured to determine at least one line of sight (LOS) range based on the navigation reckoning and satellite ephemeris data, wherein the at least one LOS range is determined between one satellite of one or more satellites and the vehicle. Additionally, the processor is configured to compare each of the at least one LOS range with range data from the GNSS receiver to acquire at least one error differential value, and compare the at least one error differential value to a threshold value, wherein the threshold value is indicative of GNSS spoofing with respect to the respective satellite of the one or more satellite. The processor is further configured to eliminate one or more spoofed GNSS satellites whose error differential value is beyond the threshold value and verify GNSS satellite measurements with an autonomous integrity algorithm. If the GNSS satellite measurements are not verified, then the processor is configured to adjust the threshold value and reset related GNSS satellites tracking channels in the GNSS receiver.

In another embodiment, a non-transitory computer readable medium is provided. The non-transitory computer-readable medium has computer-executable instructions stored thereon which, when executed by one or more processors, cause the one or more processors to: receive a series of dynamic measurements and Global Satellite Navigation System (GNSS) position data of a vehicle corresponding to a time period, wherein the GNSS position data comprises satellite ephemeris data and range data. The instructions further cause the processors to calculate navigation reckoning based on the series of dynamic measurements, and determine at least one line of sight (LOS) range based on the navigation reckoning and satellite ephemeris data. The at least one LOS range is determined between one satellite of one or more satellites and the vehicle. Additionally, the instructions further cause the processors to compare each of the at least one LOS range with GNSS range data to acquire at least one error differential value, and compare the at least one error differential value to a threshold value. The threshold value is indicative of GNSS spoofing with respect to the respective satellite of the one or more satellites. Furthermore, the instructions cause the processors to eliminate one or more spoofed GNSS satellites whose error differential value is beyond the threshold value; and additionally, verify GNSS satellite measurements with an autonomous integrity algorithm. If the GNSS satellite measurements are not verified, then the threshold value is adjusted. The instructions can also cause the processors to reset related GNSS satellite tracking channels in the GNSS receiver.

In another embodiment, a method is provided. The method comprises acquiring a series of dynamic measurements and Global Satellite Navigation System (GNSS) position data of a vehicle corresponding to a time period, wherein the GNSS position data comprises satellite ephemeris data and range data. The method further comprises calculating navigation reckoning based on the series of dynamic measurements. Additionally, the method comprises determining at least one line of sight (LOS) range based on the navigation reckoning and satellite ephemeris data, wherein the at least one LOS range is determined between one satellite of one or more satellites and the vehicle. The method further comprises comparing each of the at least one LOS range with GNSS range data to acquire at least one error differential value, and comparing the at least one error differential value to a threshold value. The threshold value is indicative of GNSS spoofing with respect to the respective satellite of the one or more satellites. The method also comprises eliminating one or more spoofed GNSS satellites whose error differential value is beyond the threshold value, and verifying GNSS satellite measurements with an autonomous integrity algorithm. If the GNSS satellite measurements are not verified, then the method comprises adjusting the threshold value. The method also comprises resetting related GNSS satellite tracking channels in the GNSS receiver.

The details of one or more embodiments are set forth in the description below. The features illustrated or described in connection with one exemplary embodiment may be combined with the features of other embodiments. Thus, any of the various embodiments described herein can be combined to provide further embodiments. Aspects of the embodiments can be modified, if necessary to employ concepts of the various patents, applications and publications as identified herein to provide yet further embodiments.

BRIEF DESCRIPTION OF THE DRAWINGS

Exemplary features of the present disclosure, its nature and various advantages will be apparent from the accompanying drawings and the following detailed description of various embodiments. Non-limiting and non-exhaustive embodiments are described with reference to the accompanying drawings, wherein like labels or reference numbers refer to like parts throughout the various views unless otherwise specified. The sizes and relative positions of elements in the drawings are not necessarily drawn to scale. For example, the shapes of various elements are selected, enlarged, and positioned to improve drawing legibility. The particular shapes of the elements as drawn have been selected for ease of recognition in the drawings. One or more embodiments are described hereinafter with reference to the accompanying drawings in which.

DETAILED DESCRIPTION

In the following detailed description, reference is made to the accompanying drawings that form a part hereof, and in which is shown by way of illustration specific illustrative embodiments. However, it is to be understood that other embodiments may be utilized, and that logical, mechanical, and electrical changes may be made. Furthermore, the method presented in the drawing figures and the specification is not to be construed as limiting the order in which the individual steps may be performed. The following detailed description is, therefore, not to be taken in a limiting sense.

The present disclosure describes techniques for identifying and excluding GNSS signals that have been potentially spoofed that if otherwise left unchecked would have provided inaccurate navigation information to a vehicle utilizing GNSS technology. The techniques described herein generally use navigation data measured by an inertial measuring system (e.g. an inertial measurement unit) that can be compared with position data acquired by a GNSS receiver. Since the inertial navigation data (e.g. velocity, acceleration, angle speed) can be measured independently of position data acquired by a GNSS receiver, the inertial navigation data provides a reliable check on incoming GNSS signals when such signals deviate too far from expected estimations.

The following techniques are designed to detect and exclude signals and associated data from satellite signals that have been disturbed before acquisition by a GNSS receiver. Though the techniques described herein are directed to detecting and excluding spoofed GNSS signals, the same principles may, where applicable, otherwise apply to other forms of GNSS disturbances. Such disturbances include other forms of GNSS signal manipulation, for example, GNSS jamming. "GNSS spoofing" as used herein means the unintentional or intentional alteration of a GNSS signal prior to acquisition by a GNSS receiver.

A GNSS receiver acquiring GNSS data is assumed throughout this disclosure to be coupled to a vehicle, whether physically (e.g. inside, mounted to), electrically, or communicatively (e.g. via a network device operated with or without a user). A network device may include a personal computing system, laptop, tablet, phone, personal digital assistant, or other such device operable to establish a connection to a network. Thus, a GNSS receiver may be physically separated from the body of the vehicle (e.g. in an independent device) and still provide GNSS signals about a position of the corresponding vehicle, such as via a network device used by an individual inside the vehicle (e.g. a laptop configured with a GNSS receiver used by the pilot or flight crew). "Vehicle" as used herein is intended to cover the full scope as used by one having ordinary skill in the art. This would include, but not limited to, air vehicles (such as commercial, recreational, and military aircraft, urban air mobility aircraft), water vehicles (such as ships, boats, submarines), space vehicles (such as satellites, unmanned aerial vehicles), and land vehicles (motor vehicles, motorcycles). Although aircraft may be illustrated throughout the disclosure, such use is pedagogical in nature and not intended to be limiting.

To illustrate in more detail, the techniques described herein utilize inertial data to provide an independent check on the integrity of GNSS position data so that when the difference between GNSS and inertial data is sufficiently significant, a determination that the received GNSS position data has been disturbed can be made. GNSS signals (e.g. radio frequency signals) are received by one or more GNSS receivers configured to determine a position of a vehicle (e.g., aircraft) based on GNSS position data derived from the GNSS signals. Inertial data includes data used to measure a navigation parameter of the vehicle (e.g. velocity, acceleration, angle speed) and calculations based off the measured navigation parameter(s), such as navigation ("dead") reckoning data. GNSS position data may include both satellite and range data. Satellite data includes satellite ephemeris data from each of the satellites used to determine the vehicle position. Range data includes data used to determine a range between the respective satellite and the GNSS receiver(s), which can include pseudorange, carrier phase, and pseudorange rate measurements.

Once acquired, the inertial data and GNSS position data are sent to a processor, which is configured to identify whether the GNSS position data is significantly different from the inertial data, and thus whether the signals corresponding to one or more satellites are spoofed. To do this, inertial data is used to determine one or more line of sight (hereinafter "LOS") range vectors with each satellite used to receive GNSS signals. This LOS range is compared with each respective pseudorange determined from the respective satellites to see if the comparison yields a difference greater than a threshold value. If the difference is lower than the threshold value, then the GNSS position data is determined to be sufficiently accurate for continued use. However, if the difference is higher than the threshold value, then the GNSS signal(s) is likely spoofed. In that case, the system may react in a variety of ways. For example, the system can eliminate any signals that exceed the threshold value and notify other components of the system and crew of the spoofing event. Notably, while inertial and GNSS range data may be compared, other such variables may be compared, for example, rates of change of ranges measured by the inertial and GNSS systems.

In some embodiments, the non-spoofed GNSS range data may be further processed to obtain residuals corresponding to each of the range data sets, which may be fed into an autonomous integrity algorithm (e.g. a RAIM-based algorithm) to further verify whether the range data is reliable. If the results indicate that the residual data is sufficiently reliable, then the verified GNSS position data is deemed to be appropriate for continued use for navigation. But if the results indicate the residual data is not reliable, the GNSS is likely spoofed and can be accordingly excluded from assessing the vehicle position. The system can also adjust the threshold values used to compare inertial and GNSS range data based on the results of the autonomous integrity algorithm and reset tracking channels in a GNSS receiver that correspond to satellites whose signals are spoofed.

Figure 1:
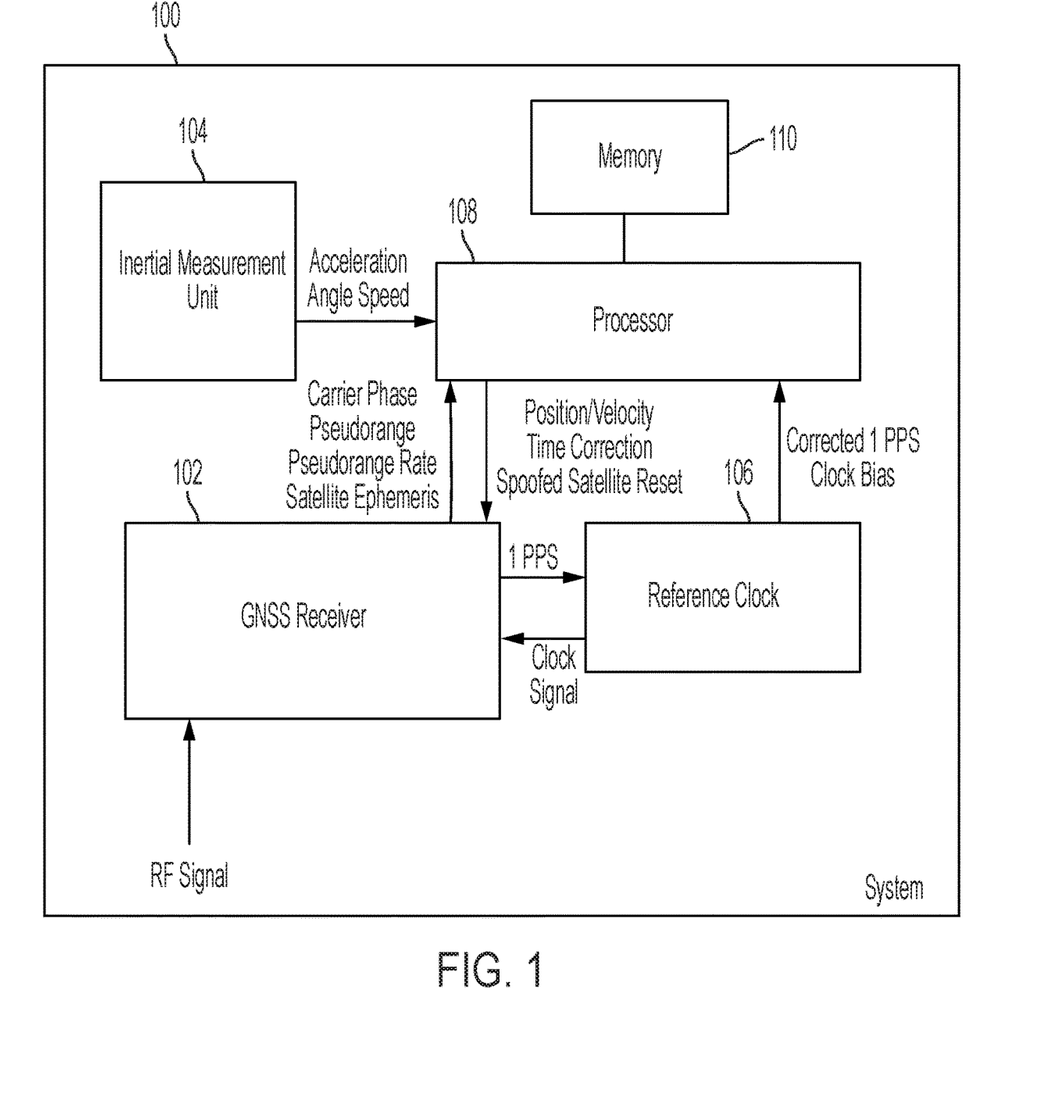
FIG. 1 depicts a block diagram of a system for identifying and excluding disturbed GNSS signals as shown in one or more embodiments.

Now referring to the drawings, FIG. 1 illustrates a system 100 for identifying and excluding spoofed GNSS signals. System 100 is designed to be implemented in a vehicle (not shown) or is otherwise configured to determine a position of a vehicle with respect to a geographical area. System 100 includes at least one GNSS receiver 102, at least one inertial measurement unit 104, a reference clock 106, and at least one processor 108. GNSS receiver 102 is configured to receive GNSS signals (e.g. RF signals) from one or more satellites. GNSS receiver 102 may include any satellite system receiver or combination to acquire satellite signals, such as a Global Positioning System (GPS) receiver, Galileo receiver, BeiDou receiver, Globalnaya Navigatsionnaya Sputnikovaya Sistema (GLONASS) receiver, or equivalent global or regional-based satellite receiver. GNSS receiver 102 is configured to determine GNSS position data, including satellite ephemeris and range data, from the acquired GNSS signals. GNSS receiver 102 is coupled to processor 108, where GNSS receiver 102 may send range data (carrier phase, pseudorange, pseudorange rate) and the satellite ephemeris data to processor 108.

GNSS receiver 102 further acquires a timely reference clock signal (such as a 1 pulse per second (PPS) signal) from the acquired GNSS signals, which corresponds to the time in which the signals were received. This time may or may not synchronize with the local clock of processor 108. The 1 PPS clock signal is sent to reference clock 106, where it can be synchronized and ultimately corrected with the local clock signal to reduce or eliminate clock bias between the local clock and the GNSS clock signal.

System 100 also includes processor 108, which is coupled to at least one inertial measurement unit (hereinafter "IMU") 104. IMU 104 is configured to acquire a series of dynamic inertial measurements related to the vehicle, such as the vehicle's velocity, acceleration, bearing (angle), or rotational rate (e.g. rates of change with respect to pitch, roll, and yaw coordinate axes). IMU 104 may include any sensors known in the art designed to measure this data, including but not limited to: gyroscopes, accelerometers, magnetometers, or equivalent sensors or circuitry. Once measured, IMU 104 also sends the dynamic measurement data to processor 108.

Figure 2:
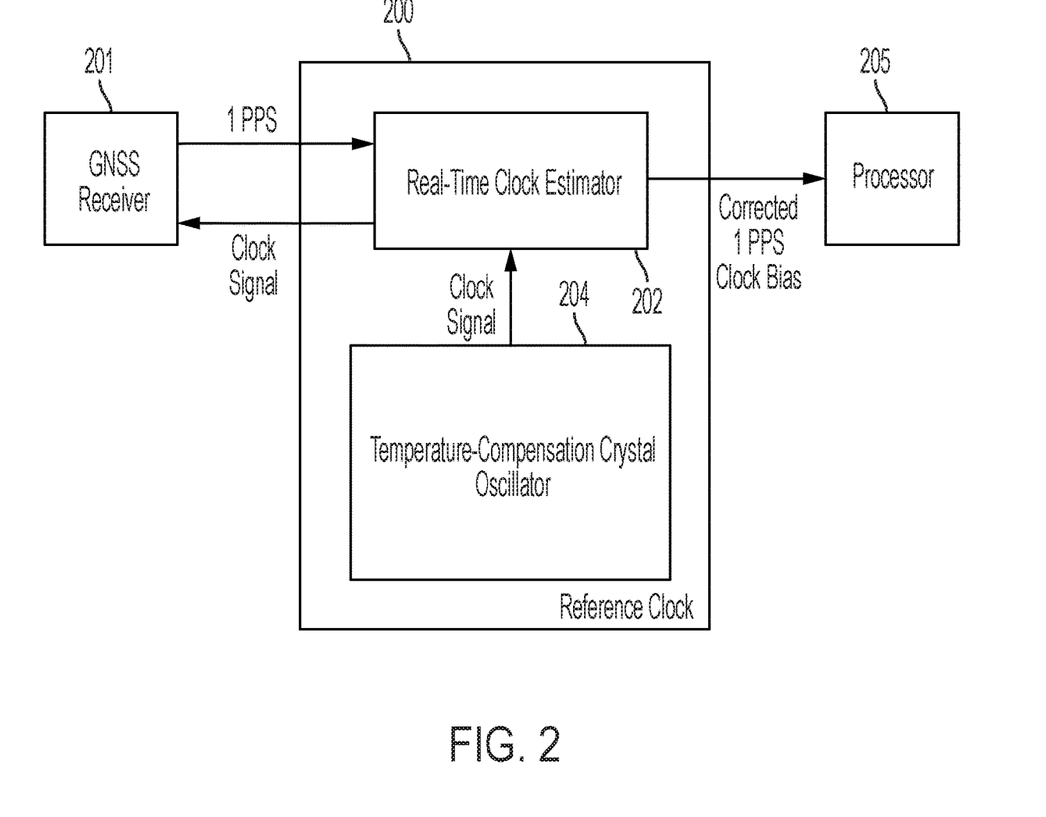
FIG. 2 depicts a block diagram of a reference clock configured to synchronize local clock signals with a GNSS clock signal as shown in one or more embodiments.

Additionally, system 100 also includes reference clock 106, which is coupled to processor 108 and GNSS receiver 102. Reference clock 106 is configured to synchronize the internal clock of GNSS receiver 102 with that of the local clock (e.g. a clock signal determined by processor 108). A non-limiting example embodiment of such a reference clock is described with reference to FIG. 2. Referring to FIG. 2, reference clock 200 includes temperature-compensation crystal oscillator (hereinafter "TCXO") 204 and real-time clock estimator 202. Although FIGS. 1-2 illustrate reference clocks 106 and 200 coupled to processors 108 and 205, respectively, the functions of reference clocks 106 and 200 can also be integrated into respective processors 108 and 205.

TCXO 204 includes an electronic oscillator circuit configured to generate a clock signal (e.g. a 10 MHz clock signal) that may be sent to real-time clock estimator 202 and further to GNSS receiver 201. Real-time clock estimator 202 receives the clock signal from TCXO 204 and reference clock signal from GNSS receiver 201, where it can synchronize the clock signal from TCXO 204 with that of the GNSS receiver 201 if the GNSS reference clock signal has accumulated significant bias. That is, real-time clock estimator 202 compares the clock signals from TCXO 204 and GNSS receiver 201 and determines the extent of clock bias between the two signals so that the GNSS position data received corresponds to a synchronized time period (e.g. epoch). Reference clock 200 (or 106 in FIG. 1) is further configured to send the synchronized clock signal and calculated clock bias to processor 205.

Referring back to FIG. 1, processor 108 is configured to detect and exclude spoofed GNSS signals received by GNSS receiver 102 based on the data provided by IMU 104. Processor 108 may include any one or combination of processors, microprocessors, digital signal processors, application specific integrated circuits, field programmable gate arrays, or other similar variants thereof. Each processor circuit may include or function with software programs, firmware, or other computer readable instructions for carrying out various process tasks, calculations, and control functions, used in the methods described herein. These instructions can be tangibly embodied on any storage media (or non-transitory computer readable media) used for storage of computer readable instructions or data structures.

Processor 108 may optionally be coupled to memory 110. Memory 110 can be configured to store data generated by processor 108, for example, memory 110 can store GNSS spoofing determination results for past measurement epochs that can be accessed at a later time (e.g. in a database). In software and/or firmware related embodiments, memory 110 can also be configured to store instructions for implementing the GNSS spoofing detection and exclusion techniques described herein, wherein processor 108 is configured to execute the instructions stored within memory 110. Memory 110 and its components described herein can be implemented with any available storage media (or computer readable medium) that can be accessed by a general purpose or special purpose computer or processor, or any programmable logic device. Suitable computer readable media may include storage or memory media such as semiconductors, magnetic, and/or optical media, and may be embodied as storing instructions in non-transitory computer readable media, such as random access memory (RAM), read-only memory (ROM), non-volatile RAM, electrically-erasable programmable ROM, flash memory, or other storage media.

Figure 3:
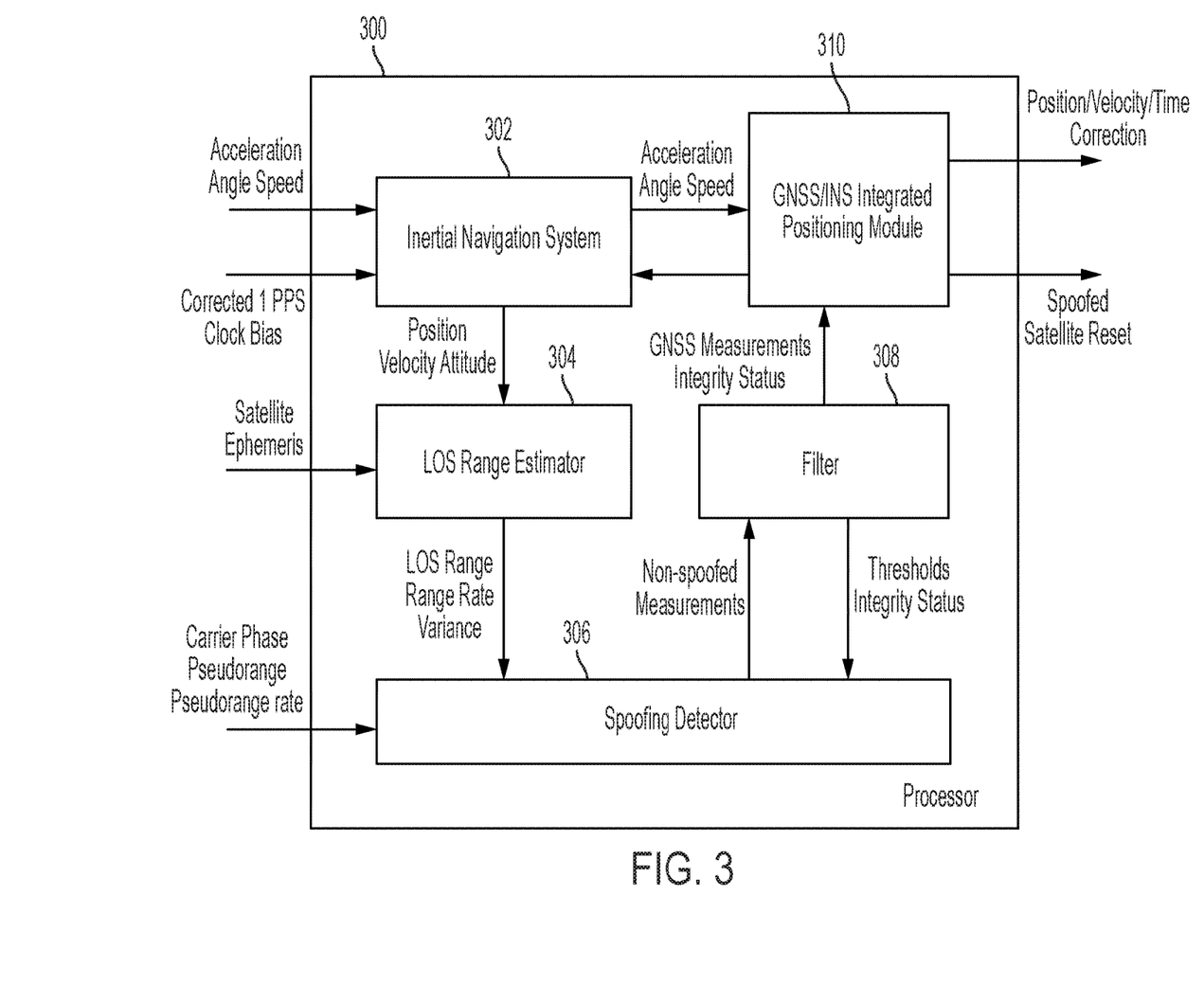
FIG. 3 depicts a block diagram of a processor configured to detect and exclude disturbed GNSS signals as shown in one or more embodiments.

FIG. 3 illustrates one embodiment of a processor configured to detect and exclude disturbed GNSS signals, such as processor 108 described in FIG. 1. As shown in FIG. 3, processor 300 may include inertial navigation system 302, LOS range estimator 304, spoofing detector 306, filter 308, and GNSS/INS integrated positioning module 310.

Inertial navigation system (hereinafter "INS") 302 receives the dynamic measurement data (e.g. vehicle velocity, acceleration, and angle speed) from IMU 104. INS 302 is configured to receive the corrected clock pulse signal and determined clock bias from reference clock 106. INS 302 includes any combination of gyroscopes, accelerometers, and/or magnetometers configured to calculate a navigation reckoning solution corresponding to a time period based on the data received by IMU 104. Navigation reckoning as used herein means the determination of a vehicle position from inertial sensors, such as IMU 104. Techniques for calculating navigation reckoning include dead reckoning techniques known in the art.

LOS range estimator 304 receives the navigation reckoning solution from INS 302, as well as the satellite ephemeris data acquired by GNSS receiver 102. Satellite ephemeris data includes, satellite orbit parameters, satellite clock parameters, satellite status parameters (health status, range accuracy, etc.). Satellite ephemeris data can be received for each satellite used to determine the position of the vehicle. The precise number of satellites used depends on the embodiment, but a sufficient number should be selected in order to give a reliable position determination (e.g. four or more satellites). One skilled in the art will recognize that increasing the number of satellites used will generally increase the accuracy of the GNSS position determination.

Once received, LOS range estimator 304 is configured to compute at least one LOS range based on the navigation reckoning solution and the satellite ephemeris data provided. That is, for each satellite that is used to determine the vehicle position, LOS range estimator 304 calculates a corresponding LOS based on the distance between the vehicle position determined by the navigation reckoning solution, and the position of the respective satellite determined by the satellite ephemeris data. In some embodiments, LOS range estimator 304 is further configured to determine an LOS range rate and variance that corresponds to each computed LOS range. The LOS range data is sent to spoofing detector 306, which is configured to compare the LOS range data, LOS range rate, and/or variance with the GNSS range data (including carrier phase, pseudorange, and pseudorange rate) acquired by GNSS receiver 102.

Figure 4:
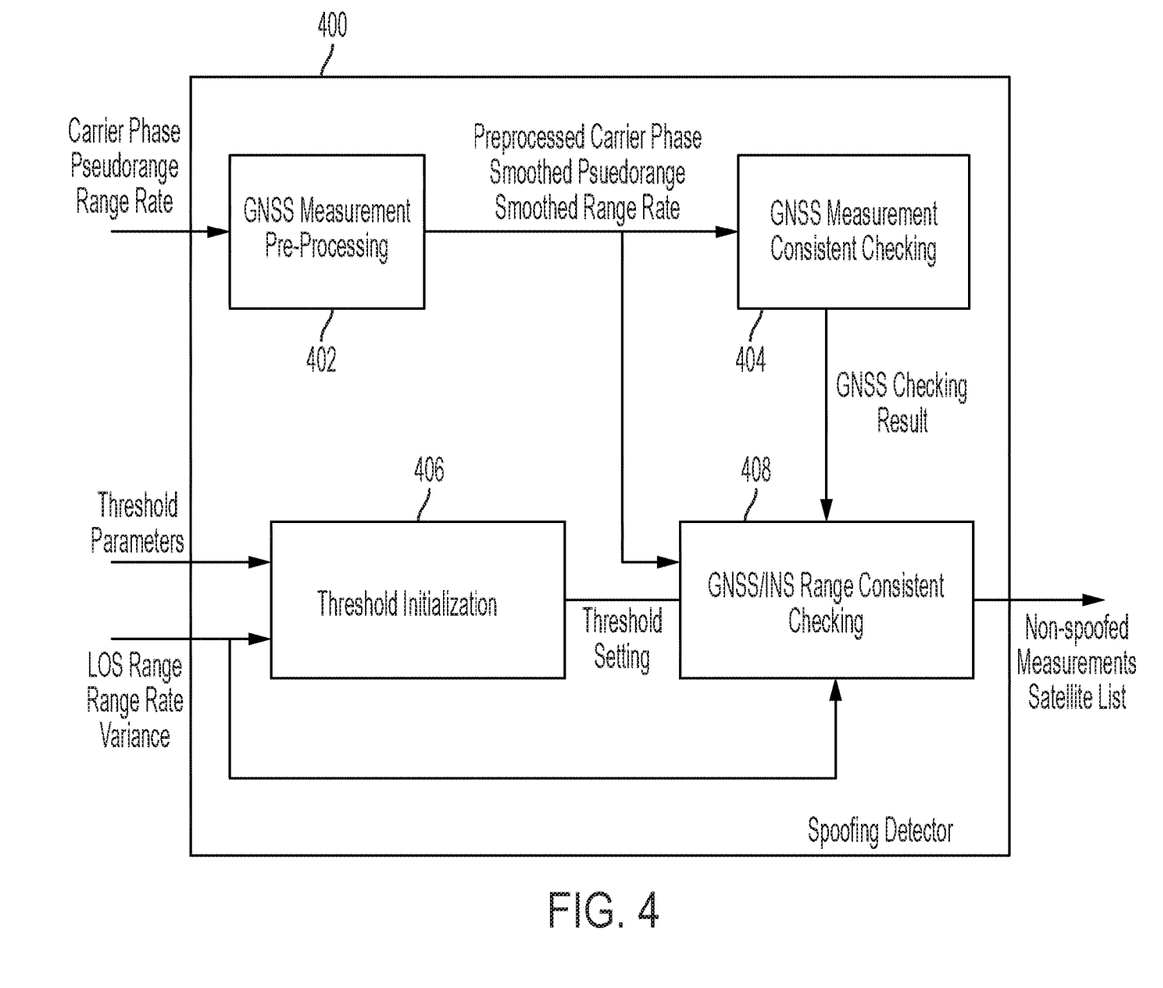
FIG. 4 depicts a block diagram of a spoofing detector configured to detect disturbed GNSS signals based on GNSS and inertial data as shown in one or more embodiments.

FIG. 4 illustrates one embodiment of a spoofing detector 400 for identifying disturbed GNSS signals. Spoofing detector 400 may include GNSS measurement pre-processing module 402, GNSS measurement consistent checking module 404, threshold initialization module 406, and GNSS/INS range consistent checking module 408. Beginning with optional GNSS measurement pre-processing module 402, GNSS range data is received including each of the computed pseudoranges for the number of satellites used to provide an initial GNSS position solution of the vehicle position. GNSS measurement pre-processing module 402 is then configured to process the received GNSS range data. For example, GNSS measurement pre-processing module 402 may smooth the pseudoranges and/or pseudorange rates with the carrier phase measurements, and/or it may eliminate undesirable discontinuities in the GNSS range data (e.g. cycle slips in the carrier phase).

The pre-processed GNSS range data is then sent to GNSS measurement consistent checking module 404. GNSS measurement consistent checking module 404 is configured to determine the consistency between the pseudorange, pseudorange rate, and/or carrier phase data. For example, GNSS measurement consistent checking module 404 can determine a difference or variance between expected and measured GNSS range data, otherwise known as a residual, before comparison with the corresponding inertial data. This difference corresponds to an error determination in the GNSS range data, such as the measured error from the expected pseudorange and/or rate, which can be used to determine the inherent consistency of the GNSS range data. The residuals can then be compared to a first threshold value indicative of consistency of the GNSS range data. The threshold value may be standard across all residuals or may be uniquely tailored based on the particular satellite. The threshold value(s) can be influenced by a variety of considerations. For example, the satellite ephemeris data of the satellites used to calculate a GNSS position solution can influence the threshold value, such as if one satellite is known to have greater uncertainty in provided measurements. The quality of the processor and/or the GNSS measurement consistent checking module 404 can also impact the thresholds. GNSS measurement consistent checking module 404 is then configured to send an output, indicated as GNSS checking result shown in FIG. 4, based on the comparison. If the comparison yields a value e.g. less than the threshold value, then the received GNSS range data is determined to be sufficiently reliable (though not necessarily free of spoofing or other external disturbances) for comparison with the received inertial data.

But if the comparison yields a value indicative of unreliability (i.e. the GNSS data is inconsistent), spoofing detector 400 can respond in a variety of ways. For example, GNSS measurement consistent checking module 404 can be configured to send a checking result of unreliability, where the GNSS range data may be rejected for comparison with the inertial data.

Spoofing detector 400 may also include threshold initialization module 406, which is configured to receive both the LOS range data (including the LOS range, range rate, and/or variance of each of the satellites) derived from the inertial data, in addition to threshold parameters from filter 308. Threshold initialization module 406 is configured to determine appropriate thresholds (separate from GNSS measurement consistent checking module 404) for GNSS and inertial data comparison, wherein the threshold values are indicative of a likelihood of GNSS spoofing. The thresholds determined by threshold initialization module 406 are referred to herein as second thresholds. In multiple iteration embodiments, as described in further detail below, threshold initialization module 406 is also configured to receive adjusted second thresholds from filter 308. In an embodiment, the second threshold set by threshold initialization module 406 is determined by a combination of: a default value (which is determined empirically), the LOS variance, and/or a step adjustment value (which is the adjustment to the original second threshold value that is determined by filter 308).

Spoofing detector 400 is designed to detect GNSS spoofing via a multi-iteration process. That is, spoofing detector 400 can continuously check and recheck received GNSS data through several iterative cycles if required, adjusting the detection parameters as needed to compensate for the needs of the system. The first iteration begins with the second thresholds set by threshold initialization module 406, which are sent to GNSS/INS range consistent checking module 408. In addition to these parameters, GNSS/INS range consistent checking module 408 also receives the LOS range(s), range rate(s), and variance data from LOS range estimator 304, the processed GNSS carrier phase(s), pseudorange(s), and range rate(s) data from GNSS measurement pre-processing module 402, and the consistency results from GNSS measurement consistent checking module 404. GNSS/INS range consistent checking module 408 is configured to determine whether the received GNSS data is spoofed via threshold comparison, specifically by comparing the set thresholds from threshold initialization module 406 with residuals determined from the difference between the LOS and GNSS range data (GNSS/INS residual).

For example, in an embodiment, GNSS/INS range consistent checking module 408 is configured to generate residuals based on the following formula:

$$\text{residual} = |\text{Range}_{INS} - \text{Range}_{GNSS}|$$

where $\text{Range}_{INS}$ is the LOS range determined by the inertial data and $\text{Range}_{GNSS}$ is the GNSS pseudorange determined by the GNSS data for each respective satellite used to determine the position of the vehicle. Each residual is compared with the second threshold(s). If the results of the threshold comparison indicate that the GNSS data is sufficiently reliable (e.g. the residuals are less than the threshold value), then the GNSS data is deemed to be non-spoofed. Likewise, if the results indicate a high degree of unreliability (e.g. the residuals are greater than the threshold value), then the GNSS data is determined to be spoofed. GNSS/INS range consistent checking module 408 is configured to exclude spoofed data and send all non-spoofed data, as well as a list of satellites used to acquire the GNSS data, for further processing.

The integrity monitoring does not stop there, however. Referring back to FIG. 3, the non-spoofed measurements determined by spoofing detector 306 (e.g. via spoofing detector 400) are received by filter 308, which is configured to verify the integrity of the non-spoofed GNSS data. An exemplary embodiment of filter 308 is illustrated in FIG. 5, which includes satellite subset generation module 502, subfilters 504a-504c, and integrity monitor 506.

Filter 500 illustrates a filter configured to generate a position solution, including a location of the vehicle, from the non-spoofed GNSS data determined from the spoofing detection results (e.g. spoofing detector 306). Filter 500 is further configured to verify the generated position solution via an integrity algorithm so that the modified position solution can be used to determine the position of the vehicle. Subset generation module 502 is configured to generate satellite data subsets based on the received list of satellites. Each satellite data subset corresponds to a grouping of satellite data. For example, if the satellite list includes five satellites (sv1, sv2, sv3, sv4, sv5), then subset generation module 502 is configured to generate five satellite data subsets. The satellite data subsets could be generated as shown in the table below, though one skilled in the art will recognize that subsets may be organized differently based on the number of satellites in the satellite list:

| Data Subset | Group Position 1 | Group Position 2 | Group Position 3 | Group Position 4 |
| --- | --- | --- | --- | --- |
| Subset 1 | sv2 | sv3 | sv4 | sv5 |
| Subset 2 | sv1 | sv3 | sv4 | sv5 |
| Subset 3 | sv1 | sv2 | sv4 | sv5 |
| Subset 4 | sv1 | sv2 | sv3 | sv5 |
| Subset 5 | sv1 | sv2 | sv3 | sv4 |

Figure 5:
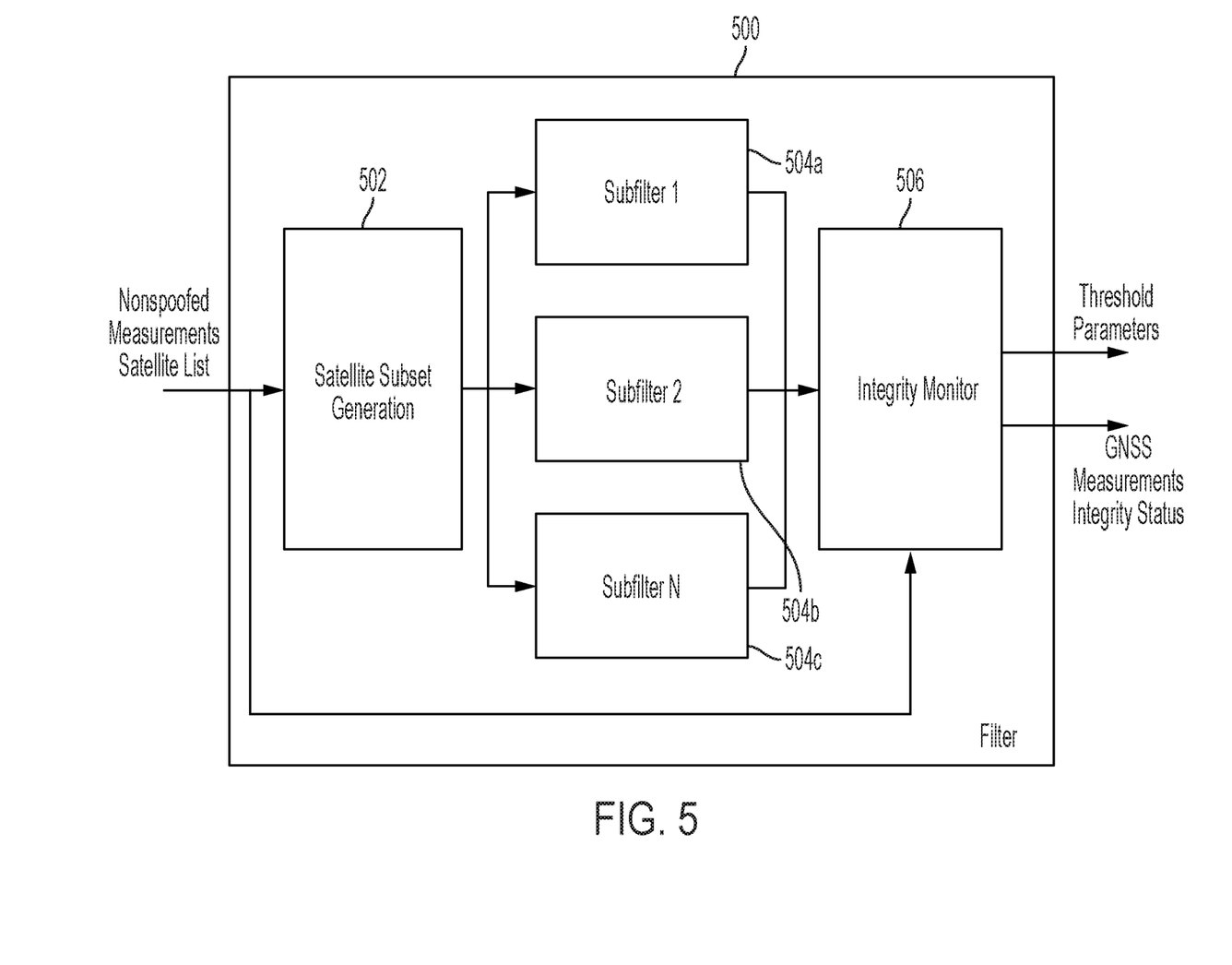
FIG. 5 depicts a block diagram of a filter configured to implement and verify a modified GNSS position solution using non-disturbed GNSS data.

These data subsets are sent to subfilters, shown in FIG. 5 as subfilters 504a-504c, where Subfilter N corresponds to the nth subfilter in a received satellite list. Although FIG. 5 displays three subfilters, one skilled in the art will recognize that the number of subfilters can be increased to any number of satellites, N, where N is a positive integer representing the total amount of satellites in the list of satellites. Accordingly, each subfilter receives the corresponding satellite data subset and is configured to generate a position solution based off the received satellite data subset. Techniques known in the art can be used to generate positioning solution, including, but not limited to, a least squared algorithm, a Kalman filter, or other such techniques. For example, using the three subfilters shown in FIG. 5, subfilter 504a would receive the first satellite data subset generated from satellite one in the list of satellites, subfilter 504b would receive the second satellite data subset generated from satellite two in the list of satellites, and subfilter 504c would receive the third satellite data subset generated from satellite three in the list of satellites. The GNSS position solution for each satellite can include GNSS range data (e.g. pseudorange) and any associated error quantities, such as residuals. In some embodiments, the error quantities also include a dilution of precision (hereinafter "DOP"), an error associated with the geometrical relationship of all the satellites involved in the positioning calculation. As described in further detail below, in some cases a minimum number of satellites (and hence subfilters) is needed to generate a position solution that can be verified.

All the GNSS position solutions, including all associated residuals and/or DOPs, are sent along with the non-spoofed measurements and the satellite list to integrity monitor 506. Integrity monitor 506 is configured to verify the integrity of the generated GNSS position solutions from each subfilter. For example, integrity monitor 506 may perform an autonomous integrity algorithm on the received data, such as a receiver autonomous integrity monitoring (hereinafter "RAIM") based algorithm, to determine whether the GNSS position solutions are significantly different from expected values and, if so, to correlate the deviant GNSS position(s) to a particular satellite(s). In some embodiments the integrity algorithm can include a more specialized RAIM technique, such as advanced RAIM ("ARAIM"), horizontal RAIM ("H-RAIM"), or vertical RAIM ("V-RAIM"). If the output of the RAIM algorithm indicates that the GNSS position solutions determined from each of the satellites is genuine, then each position solution is deemed to be non-spoofed and safe for continued reliance in navigation. By authenticating received GNSS data through both a threshold-based integrity check using position information gathered independent of GNSS technology (e.g. from spoofing detector 306) and a RAIM-based integrity check (e.g. filter 308), a vehicle can more readily identify and exclude disturbed GNSS measurements. This in turn enables vehicles to navigate with increased assurance that the information received through GNSS receivers is genuine.

However, if the results of the integrity algorithm indicate that the GNSS position solutions are unreliable, then the data received by GNSS receiver 102 at the designated epoch undergoes another iteration of integrity checking, if another iteration is available. In this case, filter 308 is configured to send the results of the integrity algorithm back to spoofing detector 306, in addition to a new set of thresholds to compare the GNSS and inertial data. Specifically, filter 308 is configured to adjust the threshold parameters used by threshold initialization module 406 based on the results of the integrity algorithm. If spoofing detector 306 determines that the GNSS data is non-spoofed, and filter 308 later determines that at least one satellite is sending spoofed measurements, then filter 308 can notify spoofing detector 306 of the inconsistency and adjust the second thresholds used by spoofing detector 306 to determine if the GNSS measurements are genuine under the adjusted second thresholds. For example, filter 308 (via, e.g., integrity monitor 506) can reduce the second threshold levels, which can increase the sensitivity of the spoofing detection process by making it generally more difficult for received GNSS data to fall within the adjusted (reduced) threshold limits. This consequently results in more satellite data excluded from integrity verification by filter 308. Any GNSS measurements that pass the adjusted second threshold comparison are sent again to filter 308, which can verify the integrity of the GNSS measurements and either determine that the data is genuine, or that it remains unreliable and undergoes another iteration of integrity checking, as described above.

However, filter 308 may determine that an additional iteration cannot be performed, even if the received GNSS data cannot be verified by an integrity algorithm. For example, if there is an insufficient number of satellites (e.g. under four satellites) that pass the threshold comparison from GNSS/INS range consistent checking module 408, filter 308 may not initiate an additional iteration. Filter 308 may still send the integrity status results to spoofing detector 306 and/or GNSS/INS integrated positioning module 310 in that circumstance, but no modified position solutions will be used for further position calculations.

Many integrity algorithms, including RAIM, require a sufficient amount of data sets in order to verify the consistency of the received data. For example, RAIM-class integrity monitoring algorithms require at least five satellite data subsets (and hence five subfilters) to verify the consistency of the input positioning solutions. If insufficient data is available (e.g. an insufficient number of GNSS measurements that pass threshold comparison from spoofing detector 306), then no verification can be performed.

Once the spoofed measurements have been identified, system 100 can perform additional actions to monitor the use of spoofed and non-spoofed GNSS measurements. Referring to FIGS. 1 and 3, processor 108 can include GNSS/INS integrated positioning module 310, which is configured to receive the verified, non-spoofed GNSS measurements and integrity status results from filter 308 and the inertial data (e.g. acceleration, angle speed) from INS 302. GNSS/INS integrated positioning module 310 is configured to determine the position of the vehicle based on the verified, non-spoofed GNSS data and the inertial data, such as by incorporating the two data types using processing techniques known in the art. It can then produce an output which represents the corrected vehicle position, including position, velocity, and/or time correction. GNSS/INS integrated positioning module 310 may optionally be configured to send the output to various other system(s) or device(s) onboard or external to the vehicle, for example, a flight control or communications system. It may also output the results to inform persons onboard the vehicle of the vehicle position, such as via a graphical user interface, to notify crew members and/or passengers of where the vehicle is at a given time.

In other embodiments, GNSS/INS integrated positioning module 310 is optionally configured to reset one or more GNSS signal tracking channels in the GNSS receiver based on the received GNSS data. In a situation where processor 300 determines that one or more satellite signals are being spoofed, GNSS/INS integrated positioning module 310 can reset the spoofed GNSS signal tracking channels to avoid feeding additional spoofed signals to GNSS receiver 102. That way, a tracking channel may eventually be reinstated at a later time (e.g. a later epoch) to acquire a new satellite signal per the request. System 100 can then continue to detect, filter, and correct additional spoofed GNSS signals that are received by GNSS receiver 102 corresponding to a different epoch as a vehicle travels to its destination.

Figure 6:
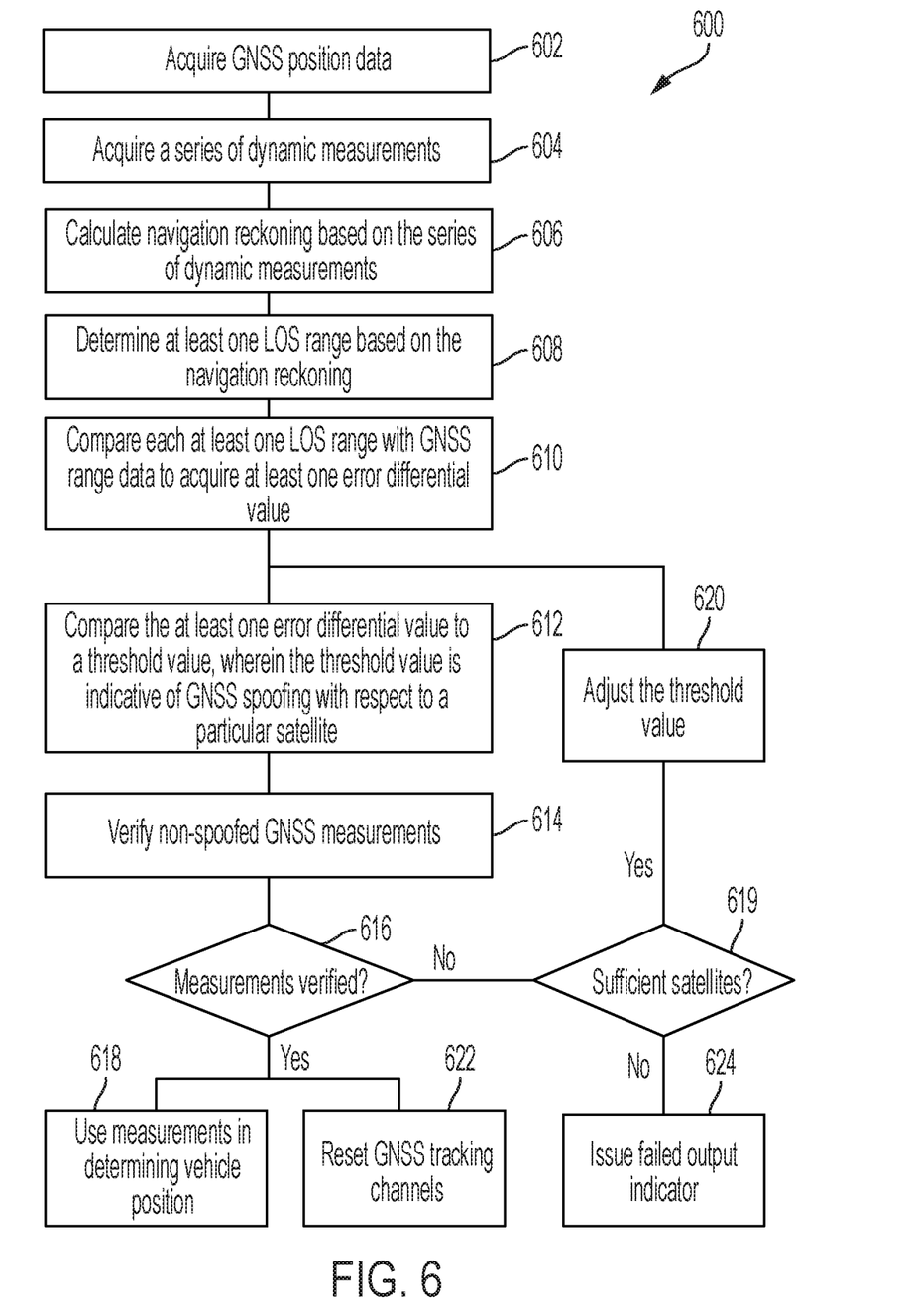
FIG. 6 depicts a flow chart of a method for identifying and excluding disturbed GNSS signals as shown in one or more embodiments.

FIG. 6 describes a method 600 for detecting and excluding disturbed GNSS data received by GNSS receiver coupled to a vehicle. Method 600 can be completed using the techniques described above with respect to FIGS. 1-5 as appropriate, but may be completed by other means as well. The blocks of the flow diagram have been arranged in a generally sequential manner for ease of explanation; however, it is to be understood that this arrangement is merely exemplary, and it should be recognized that the processing associated with the methods described herein (and the blocks shown in the Figures) may occur in a different order (for example, where at least some of the processing associated with the blocks is performed in parallel and/or in an event-driven manner).

Method 600 begins with block 602, where GNSS position data is acquired, for example, via a GNSS receiver that receives RF GNSS signals from one or more satellites in a satellite constellation. The GNSS position data corresponds to the location of a vehicle at a geographic point. As such, the GNSS position data will include GNSS range data (for example, pseudorange, pseudorange rate, and/or carrier phase measurements), in addition to satellite ephemeris data from the targeted satellite. In addition, the GNSS position data is acquired relative to a specific time period, and so an associated signal with timing information about the time in which the data is obtained should also be acquired, such as via a GNSS clock signal received with the GNSS position data.

Method 600 proceeds to block 604 by acquiring a series of dynamic (inertial) measurements related to the vehicle, such as angle speed, acceleration, and velocity of the vehicle at a designated point in time. Such measurements can be acquired via one or more inertial measurement units or any other sensor(s) configured to measure angle, acceleration, and velocity. The time period corresponds to the received GNSS clock signal, though in many cases the GNSS clock signal should be synchronized with the clock signal corresponding to the dynamic measurements (e.g. by a reference clock as described above) so that clock biases can be accounted for in further processing.

Proceeding to block 606, method 600 calculates navigation reckoning based on the series of dynamic measurements, such as via dead reckoning techniques known in the art. Data can be generated, for example, by an inertial navigation system, which can be configured to determine a position, velocity, and attitude of the vehicle from the acquired dynamic measurements. Further processing (e.g. smoothing, filtering) of the data can also be done to improve the quality of the navigation reckoning solution.

Referring now to block 608, method 600 determines at least one LOS range based on the navigation reckoning. That is, range(s) is determined from the distance between one or more satellites and the determined position of the vehicle from the dynamic measurements. In some embodiments, the at least one LOS range can also include an associated range rate and variance.

Method 600 then proceeds to block 610, where the at least one LOS range and GNSS range data (pseudorange) are compared to acquire at least one error differential value, for example, a residual. The error differential value is the difference between the ranges acquired from the GNSS position data and the LOS ranges determined from the navigation reckoning solution, which signifies the difference between the measured position of the vehicle (from the GNSS data) and the expected position determined from the inertial sensors. In some embodiments, the range rates (LOS range rate, pseudorange rate) and corresponding variances may also be compared. The error differential value is compared to a threshold value at block 612, which is set to a value that is indicative of GNSS spoofing with respect to the one or more satellites used to acquire GNSS data, to determine whether the GNSS position data has been spoofed. If the error differential value exceeds the threshold value, then the GNSS data is determined to be spoofed, and may be excluded from further analysis. If the error differential value does not exceed the threshold value, then the GNSS data is determined to be non-spoofed and then may undergo further processing as described below.

Method 600 proceeds block 614, where the non-spoofed GNSS measurements are verified in order to determine a GNSS position solution that can be used in navigation. The non-spoofed measurements can be verified by using the measurements to generate a position solution as described above, and perform an integrity monitoring algorithm, such as a RAIM-based algorithm, on the generated position solutions. The output of the integrity algorithm largely determines the next steps in method 600. Proceeding to block 616, If the non-spoofed measurements are verified, then they are deemed suitable for use in vehicle navigation, indicated at block 618. Additionally, one or more GNSS tracking channels in the GNSS receiver can be reset at block 622. For example, GNSS tracking channels corresponding to spoofed measurements can be reset in order to exclude spoofed signals from entering the GNSS receiver.

But if the non-spoofed measurements cannot be verified, another iteration of integrity checking is performed if a sufficient number of satellites are available, shown in block 619. That is, if sufficient satellites are available, such as if enough error differential values have passed the threshold check and determined to correlate to non-spoofed GNSS satellite measurements, blocks 612 and 614 can be re-performed after a few conditions are met. If enough satellites are available, method 600 proceeds to block 620, where the threshold values are adjusted based on the results of the integrity monitoring algorithm. In some embodiments, the threshold values are lowered to make it more difficult to pass the threshold check on the received GNSS data and thereby increase the sensitivity of the spoofing detection process. However, the threshold values may be adjusted in other ways as well, depending on the design and function of the spoofing detection system.

If, at block 619, an insufficient number of satellites remain to perform another iteration of spoofing detection, method 600 proceeds to block 624, where an output is issued indicating the received GNSS measurements could not be verified. In that case, no GNSS data corresponding to the particular epoch will be used in further calculations to determine the position of the vehicle. Regardless of whether multiple iterations are performed, method 600 can be repeated with a new set of received GNSS signals and dynamic measurements that correspond to a different time period.

Figure 7:
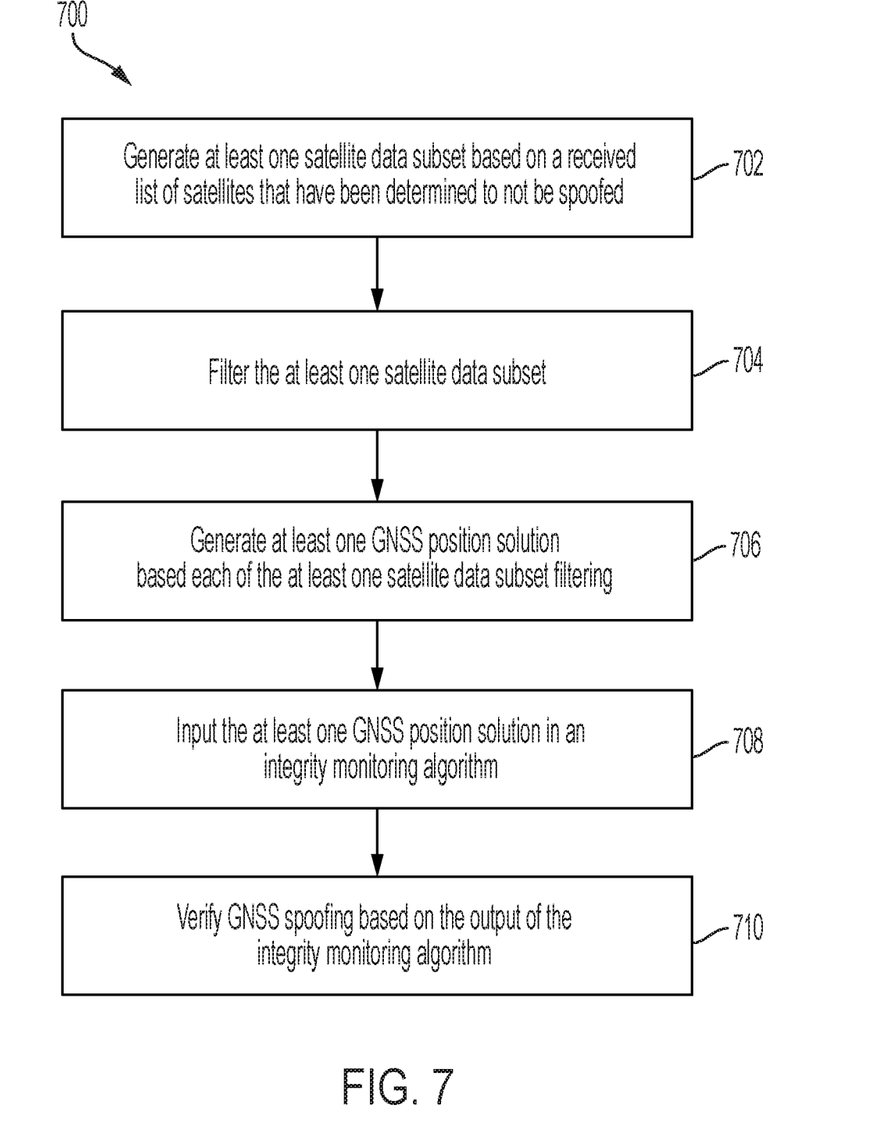
FIG. 7 depicts a flow chart of a method for filtering GNSS signals to verify non-spoofed signals as shown in one or more embodiments.

FIG. 7 is a flow chart that describes a more detailed manner of verifying received non-spoofed measurements as described with respect to FIGS. 1-6 above. Like with respect to FIG. 6, method 700 may be performed via the means described with respect to FIGS. 1-5, but may be implemented via other means as well. For example, method 700 can be performed by the filter(s) described with respect to FIGS. 3 and 5, but can also operate as an independent integrity monitoring system. The blocks of the flow diagram have been arranged in a generally sequential manner for ease of explanation; however, it is to be understood that this arrangement is merely exemplary, and it should be recognized that the processing associated with the methods described herein (and the blocks shown in the Figures) may occur in a different order (for example, where at least some of the processing associated with the blocks is performed in parallel and/or in an event-driven manner).

Method 700 begins at block 702, where at least one satellite data subset is generated based on a list of received satellites, such as those used to determine the non-spoofed GNSS pseudorange(s) that have passed (e.g. less than) a threshold value, wherein the threshold value is indicative of GNSS spoofing. Each satellite data subset corresponds to a grouping of satellite data. For example, if the satellite list includes five satellites (sv1, sv2, sv3, sv4, sv5), then subset generation module 502 is configured to generate five satellite data subsets.

Proceeding to block 704, each of the at least one satellite data subset is filtered. Specifically, each satellite data subset can be separated into subfilters as shown in FIG. 5 and filtered based on known processing techniques, such as via a least squared algorithm or Kalman filter. Since particular integrity algorithms require a sufficient number of data sets to verify received input data (e.g. at least five for RAIM-class algorithms), in some embodiments the number of subfilters is at least five.

Then, at block 706, a GNSS position solution is determined for each at least one satellite data subset based on the filtering, wherein the GNSS position solution is determined based on a position of a vehicle (e.g. aircraft). Each GNSS position solution may include a positioning result, generated residual(s), and a corresponding DOP. These values are then input into an integrity monitoring algorithm (e.g. RAIM algorithm) at block 708 to determine whether the GNSS position solutions, and corresponding satellite list measurements, can be verified. Method 700 ends at block 710, where the output of the integrity monitoring algorithm is used to verify the consistency of the GNSS position solutions. Method 700 can be repeated as additional iterations are performed with new satellite data subsets.

EXAMPLE EMBODIMENTS

Example 1 includes a system, comprising: a processor; an inertial measurement unit (IMU) coupled to the processor, wherein the IMU is configured to: acquire a series of dynamic measurements for a vehicle corresponding to a time period, and transmit the series of dynamic measurements to the processor; a Global Navigation Satellite System (GNSS) receiver coupled to the processor, wherein the GNSS receiver is configured to: receive GNSS data for the vehicle comprising satellite ephemeris data and range data corresponding to the time period, transmit the GNSS position data to the processor; and a reference clock coupled to the GNSS receiver and the processor, wherein the reference clock is configured to synchronize the time period with a reference time period; wherein the processor is configured to: calculate navigation reckoning based on the series of dynamic measurements, determine at least one line of sight (LOS) range based on the navigation reckoning and satellite ephemeris data, wherein the at least one LOS range is determined between one satellite of one or more satellites and the vehicle, compare each of the at least one LOS range with range data from the GNSS receiver to acquire at least one error differential value, compare the at least one error differential value to a threshold value, wherein the threshold value is indicative of GNSS spoofing with respect to the respective satellite of the one or more satellite; eliminate one or more spoofed GNSS satellites whose error differential value is beyond the threshold value; verify GNSS satellite measurements with an autonomous integrity algorithm, if the GNSS satellite measurements are not verified, then adjust the threshold value; and reset related GNSS satellites tracking channels in the GNSS receiver.

Example 2 includes the system of Example 1, wherein to verify GNSS satellite measurements further comprises using an autonomous receiver integrity monitoring algorithm (RAIM).

Example 3 includes the system of any of Examples 1-2, wherein to verify GNSS satellite measurements further comprises to: generate at least one GNSS satellite data set based on each of the GNSS satellite measurements whose corresponding error differential value is less than the threshold value; filter the at least one GNSS satellite data set; generate at least one GNSS position solution based on the filtering; and verify the at least one GNSS position solution using an autonomous integrity algorithm.

Example 4 includes the system of Example 3, wherein to filter the at least one GNSS satellite data set further comprises to filter using a least squared algorithm or a Kalman filter.

Example 5 includes the system of any of Examples 1-4, wherein the processor is further configured to determine a position of the vehicle based on the verified GNSS satellite measurements.

Example 6 includes the system of any of Examples 1-5, wherein the range data comprises at least one of carrier phase, pseudorange, and psuedorange rate data.

Example 7 includes the system of any of Examples 1-6, wherein the at least one error differential value is determined by the absolute value of a difference between the at least one LOS range and a respective pseudorange corresponding to one satellite of the one or more satellites.

Example 8 includes a non-transitory computer-readable medium having computer-executable instructions stored thereon which, when executed by one or more processors, cause the one or more processors to: receive a series of dynamic measurements and Global Satellite Navigation System (GNSS) position data of a vehicle corresponding to a time period, wherein the GNSS position data comprises satellite ephemeris data and range data; calculate navigation reckoning based on the series of dynamic measurements; determine at least one line of sight (LOS) range based on the navigation reckoning and satellite ephemeris data, wherein the at least one LOS range is determined between one satellite of one or more satellites and the vehicle; compare each of the at least one LOS range with GNSS range data to acquire at least one error differential value; compare the at least one error differential value to a threshold value, wherein the threshold value is indicative of GNSS spoofing with respect to the respective satellite of the one or more satellites; eliminate one or more spoofed GNSS satellites whose error differential value is beyond the threshold value; verify GNSS satellite measurements with an autonomous integrity algorithm, if the GNSS satellite measurements are not verified, then adjust the threshold value; and reset related GNSS satellite tracking channels in the GNSS receiver.

Example 9 includes the non-transitory computer-readable medium of Example 8, wherein the computer-executable instructions further cause the one or more processors to synchronize the time period with a reference time period.

Example 10 includes the non-transitory computer-readable medium of any of Examples 8-9, wherein to verify GNSS satellite measurements further comprises using an autonomous receiver integrity monitoring algorithm (RAIM).

Example 11 includes the non-transitory computer-readable medium of any of Examples 8-10, wherein the computer-executable instructions further cause the one or more processors to: generate at least one GNSS satellite data set based on each of the GNSS satellite measurements whose corresponding error differential value is less than the threshold value; filter the at least one GNSS satellite data set; generate at least one GNSS position solution based on the filtering; and verify the at least one GNSS position solution using an autonomous integrity algorithm.

Example 12 includes the non-transitory computer-readable medium of Example 11, wherein to filter the at least one GNSS satellite data set further comprises to filter using a least squared algorithm or a Kalman filter.

Example 13 includes the non-transitory computer-readable medium of any of Examples 8-12, wherein the computer-executable instructions further cause the one or more processors to determine a position of the vehicle based on the verified GNSS satellite measurements.

Example 14 includes the non-transitory computer-readable medium of any of Examples 8-13, wherein the at least one error differential value is determined by the absolute value of a difference between the at least one LOS range and a respective pseudorange corresponding to one satellite of the one or more satellites.

Example 15 includes a method, comprising: acquiring a series of dynamic measurements and Global Satellite Navigation System (GNSS) position data of a vehicle corresponding to a time period, wherein the GNSS position data comprises satellite ephemeris data and range data; calculating navigation reckoning based on the series of dynamic measurements; determining at least one line of sight (LOS) range based on the navigation reckoning and satellite ephemeris data, wherein the at least one LOS range is determined between one satellite of one or more satellites and the vehicle; comparing each of the at least one LOS range with GNSS range data to acquire at least one error differential value; comparing the at least one error differential value to a threshold value, wherein the threshold value is indicative of GNSS spoofing with respect to the respective satellite of the one or more satellites; eliminating one or more spoofed GNSS satellites whose error differential value is beyond the threshold value; verifying GNSS satellite measurements with an autonomous integrity algorithm, if the GNSS satellite measurements are not verified, then adjusting the threshold value; and resetting related GNSS satellite tracking channels in the GNSS receiver.

Example 16 includes the method of Example 15, further comprising synchronizing the time period with a reference time period.

Example 17 includes the method of any of Examples 15-16, wherein the at least one error differential value is determined by the absolute value of a difference between the at least one LOS range and a respective pseudorange corresponding to one satellite of the one or more satellites.

Example 18 includes the method of any of Examples 15-17, further comprising: generating at least one GNSS satellite data set based on each of the GNSS satellite measurements whose corresponding error differential value is less than the threshold value; filtering the at least one GNSS satellite data set; generating at least one GNSS position solution based on the filtering; and verifying the at least one GNSS position solution using an autonomous integrity algorithm.

Example 19 includes the method of Example 18, wherein filtering the at least one GNSS satellite data set further comprises using a least squared algorithm or a Kalman filter.

Example 20 includes the method of any of Examples 15-19, further comprising determining a position of a vehicle based on the verified GNSS satellite measurements.

From the foregoing, it will be appreciated that, although specific embodiments have been described herein for purposes of illustration, various modifications may be made without deviating from the spirit and scope of the disclosure. Furthermore, where an alternative is disclosed for a particular embodiment, this alternative may also apply to other embodiments even if not specifically stated. Moreover, the circuit components described above may be disposed on a single or multiple integrated circuit (IC), one or more microprocessors, or one or more microcontrollers. In addition, one or more components of a described apparatus or system may have been omitted from the description for clarity or another reason. Furthermore, one or more components of a described apparatus or system that have been included in the description may be omitted from the apparatus or system. The term "module" as used herein is intended to include appropriate circuitry configured to perform the corresponding functions.

What is claimed is:

1. A system, comprising:
a processor;
an inertial measurement unit (IMU) coupled to the processor, wherein the IMU is configured to:
acquire a series of dynamic measurements for a vehicle corresponding to a time period, and
transmit the series of dynamic measurements to the processor;
a Global Navigation Satellite System (GNSS) receiver coupled to the processor, wherein the GNSS receiver is configured to:
acquire, from received GNSS signals, GNSS position data for the vehicle comprising satellite ephemeris data and range data corresponding to the time period, and
transmit the GNSS position data to the processor; and
a reference clock coupled to the GNSS receiver and the processor, wherein the reference clock is configured to synchronize the time period with a reference time period;
wherein the processor is configured to:
calculate navigation reckoning based on the series of dynamic measurements,
determine at least one line of sight (LOS) range based on the navigation reckoning and the satellite ephemeris data, wherein the at least one LOS range is determined between one satellite of one or more satellites and the vehicle,
compare each of the at least one LOS range with the range data from the GNSS receiver to acquire at least one error differential value,
compare the at least one error differential value to a threshold value, wherein the threshold value is indicative of GNSS spoofing with respect to a respective satellite of the one or more satellite;
eliminate one or more spoofed GNSS satellites whose error differential value is beyond the threshold value;
verify range data corresponding to non-spoofed GNSS satellites with an autonomous integrity algorithm,
if the range data are not verified, then adjust the threshold value and reset related GNSS satellites tracking channels in the GNSS receiver.

2. The system of claim 1, wherein to verify the range data further comprises using an autonomous receiver integrity monitoring algorithm (RAIM).

3. The system of claim 1, wherein to verify the range data further comprises to: generate at least one GNSS satellite data set based on each of the range data whose corresponding error differential value is less than the threshold value; filter the at least one GNSS satellite data set; generate at least one GNSS position solution based on the filtering; and verify the at least one GNSS position solution using an autonomous integrity algorithm.

4. The system of claim 3, wherein to filter the at least one GNSS satellite data set further comprises to filter using a least squared algorithm or a Kalman filter.

5. The system of claim 1, wherein the processor is further configured to determine a position of the vehicle based on the verified range data.

6. The system of claim 1, wherein the range data comprises at least one of carrier phase, pseudorange, and psuedorange rate data.

7. The system of claim 1, wherein the at least one error differential value is determined by the absolute value of a difference between the at least one LOS range and a respective pseudorange corresponding to one satellite of the one or more satellites.

8. A non-transitory computer-readable medium having computer-executable instructions stored thereon which, when executed by one or more processors coupled to an IMU and a GNSS receiver, cause the one or more processors to:
acquire, from the IMU, a series of dynamic measurements of a vehicle and, from received GNSS signals, GNSS position data of the vehicle, the dynamic measurements and GNSS position data corresponding to a time period, wherein the GNSS position data comprises satellite ephemeris data and range data;
calculate navigation reckoning based on the series of dynamic measurements;
determine at least one line of sight (LOS) range based on the navigation reckoning and the satellite ephemeris data, wherein the at least one LOS range is determined between one satellite of one or more satellites and the vehicle;
compare each of the at least one LOS range with the GNSS range data to acquire at least one error differential value;
compare the at least one error differential value to a threshold value, wherein the threshold value is indicative of GNSS spoofing with respect to a respective satellite of the one or more satellites;

eliminate one or more spoofed GNSS satellites whose error differential value is beyond the threshold value;

verify range data corresponding to non-spoofed GNSS satellites with an autonomous integrity algorithm, if the range data are not verified, then adjust the threshold value, and reset related GNSS satellite tracking channels in the GNSS receiver.

9. The non-transitory computer-readable medium of claim 8, wherein the computer-executable instructions further cause the one or more processors to synchronize the time period with a reference time period.

10. The non-transitory computer-readable medium of claim 8, wherein to verify the range data further comprises using an autonomous receiver integrity monitoring algorithm (RAIM).

11. The non-transitory computer-readable medium of claim 8, wherein to verily the range data, the computer-executable instructions further cause the one or more processors to:

generate at least one GNSS satellite data set based on each of the range data whose corresponding error differential value is less than the threshold value;

filter the at least one GNSS satellite data set;

generate at least one GNSS position solution based on the filtering; and verify the at least one GNSS position solution using an autonomous integrity algorithm.

12. The non-transitory computer-readable medium of claim 11, wherein to filter the at least one GNSS satellite data set further comprises to filter using a least squared algorithm or a Kalman filter.

13. The non-transitory computer-readable medium of claim 8, wherein the computer-executable instructions further cause the one or more processors to determine a position of the vehicle based on the verified range data.

14. The non-transitory computer-readable medium of claim 8, wherein the at least one error differential value is determined by the absolute value of a difference between the at least one LOS range and a respective pseudorange corresponding to one satellite of the one or more satellites.

15. A method executed by one or more processors coupled to an IMU and a GNSS receiver, comprising:

acquiring, from the IMU, a series of dynamic measurements of a vehicle and, from GNSS signals received at the GNSS receiver, GNSS position data of the vehicle, the dynamic measurements and GNSS position data corresponding to a time period, wherein the GNSS position data comprises satellite ephemeris data and range data;

calculating navigation reckoning based on the series of dynamic measurements;

determining at least one line of sight (LOS) range based on the navigation reckoning and the satellite ephemeris data, wherein the at least one LOS range is determined between one satellite of one or more satellites and the vehicle;

comparing each of the at least one LOS range with the GNSS range data to acquire at least one error differential value;

comparing the at least one error differential value to a threshold value, wherein the threshold value is indicative of GNSS spoofing with respect to a respective satellite of the one or more satellites;

eliminating one or more spoofed GNSS satellites whose error differential value is beyond the threshold value;

verifying range data corresponding to non-spoofed GNSS satellites with an autonomous integrity algorithm, determining that at least one range is not verified, and adjusting the threshold value and resetting related GNSS satellite tracking channels in the GNSS receiver.

16. The method of claim 15, further comprising synchronizing the time period with a reference time period.

17. The method of claim 15, wherein the at least one error differential value is determined by the absolute value of a difference between the at least one LOS range and a respective pseudorange corresponding to one satellite of the one or more satellites.

18. The method of claim 15, further comprising, to verify the range data:

generating at least one GNSS satellite data set based on each of the range data whose corresponding error differential value is less than the threshold value;

filtering the at least one GNSS satellite data set;

generating at least one GNSS position solution based on the filtering; and verifying the at least one GNSS position solution using an autonomous integrity algorithm.

19. The method of claim 18, wherein filtering the at least one GNSS satellite data set further comprises using a least squared algorithm or a Kalman filter.

20. The method of claim 15, further comprising determining a position of a vehicle based on the verified range data.

* * * * *